March 20, 1951 R. W. GILBERT 2,546,093
FIELD STRENGTH METER
Filed Oct. 30, 1946

INVENTOR.
Roswell W. Gilbert,
BY:
Pierce, Scheffler & Parker,
Attorneys.

Patented Mar. 20, 1951

2,546,093

UNITED STATES PATENT OFFICE 2,546,093

FIELD STRENGTH METER

Roswell W. Gilbert, Montclair, N. J., assignor to Weston Electrical Instrument Corporation, Newark, N. J., a corporation of New Jersey Application October 30, 1946, Serial No. 706,676

4 Claims. (Cl. 171—95)

This invention relates to measuring instruments and, in particular to those for indicating the presence and approximate magnitude of electrical fields, especially in the high and ultra high frequency ranges.

The general object of the invention is to provide a new and improved construction for an instrument of the class described which is economical to manufacture, compact, light in weight and which is equally adaptable for hand use or for wall mounting.

Another object is to provide a field strength instrument comprising an indicator component and a probe component, the two parts being readily detachable for replacement of either part or for insertion of a cable between them to permit the meter component to be located somewhat remote from the probe.

Another object is to provide a novel construction for a probe used in investigating electric field phenomena.

These and other objects and advantages of the invention will become more apparent from the following detailed description of a preferred embodiment when considered with the accompanying drawings in which.

Figure 1:
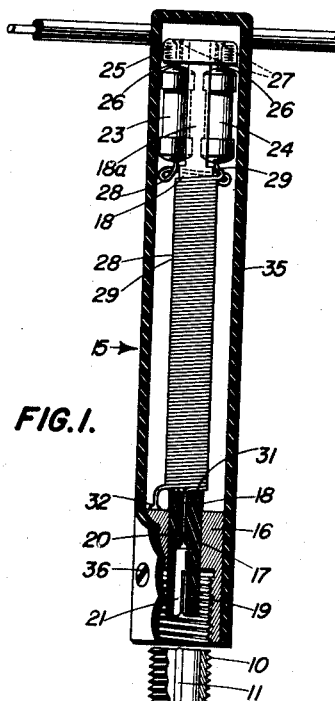
Fig. 1 is a front view of the instrument, the probe component being shown detached from the indicator and mostly in section to show details of its construction.
Figure 2:
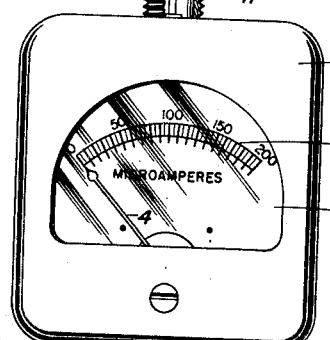
Fig. 2 is a side elevation of the meter component.
Figure 2:
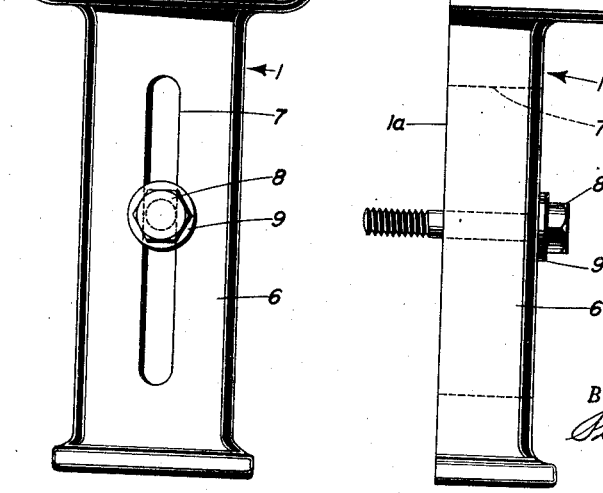

Referring now to Fig. 1, the field strength indicator component is comprised of a support member 1 preferably made from material having a good insulating characteristic such as a plastic. It includes an upper housing section 2 that contains a sensitive current indicating device such as a microammeter 3 of the permanent magnet, movable coil type, the pointer 4 being rotated over the scale 5 as a function of the magnitude of the current passed through the instrument coil, and a lower hand portion 6 provided with a rather long and vertically extending slot 7. As shown in Fig. 2, the rear face 1a of the support 1 is flat so as to permit it to be attached to and lie against a wall or other support by means of a bolt 8 which extends through the slot 7, a washer 9 being placed between the head of the bolt and the front face of the handle so as to clamp the device tightly against the wall.

A threaded sleeve 10 of electrically conductive material with a center conducting pin 11 extends upwardly through the top wall of the casing 2 and these are connected inside of the casing by leads (not shown) to the two terminals on the microammeter 3 leading to the coil.

The probe component is generally indicated by reference numeral 15 and is comprised of a cylindrical member 16 of electrically conductive material that is bored axially at 17 for receiving and supporting the lower end of a cylindrical post 18 of insulating material. The lower end of the bore through member 16 is enlarged at 19 to the diameter of sleeve 10 and is internally threaded for threaded engagement with this sleeve.

The lower end of post 18 is provided with an axial bore 20 for the insertion of a multi-fingered socket 21 within which the pin 11 is received as the probe 15 and casing are coupled together.

Figure 3:
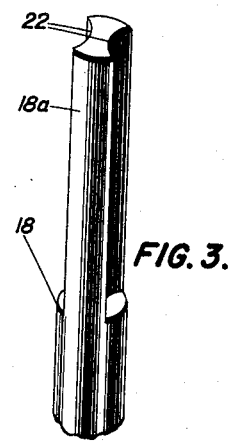
Fig. 3 is an enlarged fragmentary perspective view of the upper portion of a support rod in the probe.

The upper end 18a of the post 18 as shown in Fig. 3 includes a pair of oppositely disposed arcuately shaped recesses 22 that extend longitudinally for supporting a pair of crystal rectifiers 23 and 24, known commercially as the "1N" type.

A round plate 25 of conductive material is supported on the top end face of post 18. This plate is electrically connected to the upper terminals of the two rectifiers 23 and 24 by means of leads 26 which may be soldered to slugs of solder 27 embedded in the top of plate 25.

A double coil R. F. choke is wound on post 18 and consists of two coils 28 and 29 wound in the same relative direction. The upper end of coil 28 is connected to the lower end of rectifier 23 and its lower end is connected to the socket 21 by means of a radial bore 31 in post 18 which connects with the axial bore 20. The upper end of coil 29 is connected to the lower end of rectifier 24 and its lower end connected to the conductive body member 16 such as by soldering at 32.

Figure 4:
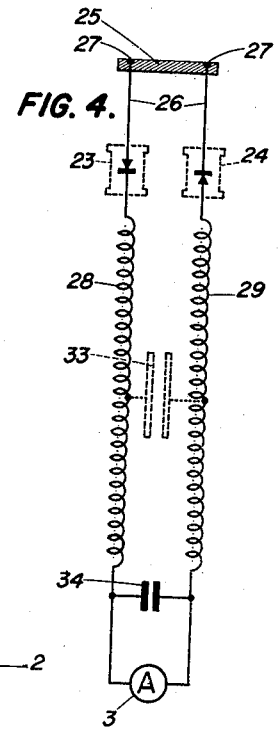
Fig. 4 is a schematic circuit diagram of the instrument.

As seen in Fig. 4, these electrical connections are such that the upper ends of the choke coils are connected to the rectifiers while the lower ends are connected to the terminals on microammeter 3. It is also to be noted in Fig. 4 that the rectifiers 23 and 24 are so connected in a loop circuit including the coils 28, 29, plate 25 and the rectifiers as to establish a unidirectional flow of current through the microammeter 3.

The distributed capacity between coils 28 and 29 is indicated in Fig. 4 by plates 33 drawn in by broken lines. A separate by-pass condenser 34 between these coils may in some cases be desirable. The latter has not been shown in the other views.

The probe component 15 is preferably encased in an insulating tube 35 which is closed at the top end and open at the bottom end. The tube is of such internal diameter as to fit snugly over the cylindrical body member 16 and may be secured in place by one or more screws 36 that thread into the member 16.

Operation

The manner of operation of the device should now be apparent. If hand use is intended, the instrument (with the indicator casing and probe 15 coupled together) may, for example, be brought into proximity with a conductor 37 to be investigated, substantially as shown in Fig. 1. In known manner, the high frequency field associated with the conductor induces a high frequency potential gradient along the elements within the probe through the space capacitance existing between the probe and the conductor. The resultant high frequency current flows through the rectifier elements 23 and 24 producing a direct current component which will be indicated on the microammeter. The scale of the microammeter 3 is not intended to be graduated in any absolute system of notation since the instrument is good only for obtaining reasonably accurate approximations of the absolute values of the fields.

If it is desired to locate the meter at a somewhat remote distance from the probe 15, they may be detached from each other and electrically coupled by the insertion of a two wire cable (not shown) of the desired length with suitable end connections for screw threaded attachment to the sleeve 10 and body member 16.

If the instrument is attached to a wall or other support, the slot and bolt connection in the handle 6 will permit fine adjustment of the probe 15 with respect to the conductor 37 so as to locate the probe at any desired point in the high frequency field.

The field strength measuring instrument which has been described has wide application and numerous uses will be found for it by those working in this art. To note a few, the following may be listed:

*a.* Resonance indication in tank circuits where grid current or thermal instruments are not installed.

*b.* Power amplifier balancing or neutralizing.

*c.* Parasite detecting and tracing (by short period standing waves on circuit leads or transmission lines).

*d.* Detection of R.-F. in power rectifier plate supplies (the usual cause of arc-back troubles).

*e.* Shielding leaks and location of radiation leaks in high frequency heating installations.

*f.* Transmission line balancing and matching.

*g.* Phasing of antenna arrays.

*h.* Resonance indication in simple frequency meters.

*i.* Routine checking of small mobile transmitters by indicating R.-F. voltage in antenna (small aircraft, police cars, etc.).

In conclusion, it will of course be understood that while in accordance with the patent statutes I have shown and described a preferred embodiment of the invention, various changes in the construction and arrangement of parts may be made without departing from the spirit and scope of the invention as defined in the appended claims.

I claim:

1. In an instrument of the class described; a probe adapted for capacitative coupling to a measured circuit, said probe comprising an elongated double coil choke, a pair of rectifiers supported at the upper end of said choke, and a conductive plate supported above said rectifiers and which constitutes one electrode of the coupling, each said rectifier being connected between said plate and the upper end of one of said choke coils; a support of insulating material for said probe, said support including an upper housing and a lower handle portion; a current indicating device within said housing; and means detachably connecting said probe to said housing, the lower ends of said choke coils being electrically connected to said current indicating device through said detachable connecting means.

2. An instrument as defined in claim 1 wherein the handle portion of said support is provided with an elongated vertical slot for receiving a bolt whereby said instrument may be adjustably attached to a wall member.

3. A probe for use in the investigation of electrical fields, said probe comprising an insulating post, the lower portion of said post being cylindrical and the upper portion recessed at opposite sides, a rectifier disposed in each recess, a conductive plate above said rectifiers, an elongated double wound choke on the cylindrical portion of said post, a cylindrical support member of conductive material having an upper axial bore for receiving the lower end of said post and a lower threaded portion, and a socket disposed within an axial recess at the lower end of said post, said rectifiers being connected respectively between said plate and the upper ends of said choke coils, the lower ends of said coils being connected respectively to said socket and to said support member.

4. In an instrument of the class described, a probe adapted for capacitative coupling to a measured circuit, said probe comprising an elongated choke coil, rectifier means supported at the upper end of said coil, a conductive plate constituting one electrode of said coupling supported above said rectifier means, and electrical connections from said plate to said coil through said rectifier means, an insulating member supporting said probe, a current indicating device carried by said insulating member, and electrical connections between said coil and current indicating device.

ROSWELL W. GILBERT.

REFERENCES CITED

The following references are of record in the file of this patent:

UNITED STATES PATENTS

| Number | Name | Date |
|---|---|---|
| 2,088,584 | Bucky | Aug. 3, 1937 |
| 2,103,179 | Rennau | Dec. 21, 1937 |
| 2,134,589 | Stanek | Oct. 25, 1938 |
| 2,323,996 | Hubbard | July 13, 1943 |
| 2,375,591 | Sweitzer | May 8, 1945 |
| 2,468,125 | Silver | Apr. 26, 1949 |

FOREIGN PATENTS

| Number | Country | Date |
|---|---|---|
| 522,276 | Great Britain | June 13, 1940 |

OTHER REFERENCES

Publication, A Portable Electrometer for the Measurement of Electrostatic Charges; Bulgin, Journal of Scientific Instruments, vol. 22, Aug. 1945.